United States Patent [19]

Ito et al.

[11] 3,953,236

[45] Apr. 27, 1976

[54] LEAD STORAGE BATTERY

[75] Inventors: Takashi Ito, Toyonaka; Koichiro Ohtomo, Takatsuki, both of Japan

[73] Assignees: Kanebo Kabushiki Kaisha, Tokyo; Ko Kondo, both of Japan

[22] Filed: Aug. 30, 1974

[21] Appl. No.: 502,222

[30] Foreign Application Priority Data
Sept. 5, 1973   Japan.................................. 48-99950

[52] U.S. Cl.................................. 136/26; 136/146
[51] Int. Cl.².......................................... H01M 4/36
[58] Field of Search............................... 136/146, 26

[56] References Cited
UNITED STATES PATENTS

| | | | |
|---|---|---|---|
| 3,247,025 | 4/1966 | Beaulieu et al. | 136/146 |
| 3,297,638 | 1/1967 | Beaulieu | 136/146 X |
| 3,328,207 | 6/1967 | Beaulieu et al. | 136/146 |
| 3,475,355 | 10/1969 | Decker | 136/146 X |
| 3,563,802 | 2/1971 | Ogden | 136/146 X |
| 3,694,310 | 9/1972 | Emanuelson et al. | 136/146 X |
| 3,765,942 | 10/1973 | Jache | 136/26 |
| 3,779,958 | 12/1973 | Ohba | 136/146 X |
| 3,821,074 | 6/1974 | Lin et al. | 136/146 X |

*Primary Examiner*—John H. Mack
*Assistant Examiner*—C. F. LeFevour
*Attorney, Agent, or Firm*—Cushman, Darby & Cushman

[57]   ABSTRACT

A lead-acid storage battery, in one aspect of this invention, comprises units of cells each having, between alternate fibrous structure and negative plate which are arranged in laminated fashion on each side of a positive plate which is coated on both surfaces with an anode active material, a separator comprised of a paper-like sheet having continuous micro-porous openings throughout the entire area thereof and containing at least 70% by weight of phenol resin fibers each having a diameter of 5 microns or less produced by melt-spinning and curing a novolak resin. A lead storage battery having such separators is of an improved cell capacity and output and a prolonged life span. In another aspect of the invention, the separators are such that said phenol resin fibers have at least 60% by mole of the phenolic hydroxyl groups of the resin capped. A battery employing these separators is of further improved duration and satisfactory cell capacity and output.

1 Claim, No Drawings

LEAD STORAGE BATTERY

BACKGROUND OF THE INVENTION a. Field of the Invention:

The present invention concerns a paste-type lead-acid storage battery, and more particularly it relates to the cell electrode structure of such a battery, and still more specifically it pertains to improved separators for use in such a cell electrode structure.

b. Description of the Prior Art:

Paste-type lead-acid storage batteries which will be briefly called lead storage battery hereinafter in this specification have heretofore been widely used as the power sources for starting the engines of ordinary type automobiles. However, as the exhaust gases from automobiles powered by internal combustion engines have, of late, become the subject of severe criticism as being a major source of air pollution, lead storage batteries are now freshly attracting the interest of the public as being suitable for the power source of electric cars. For this reason, there is a growing demand for the provision of a lead storage battery exerting an improved performance with respect to its electric capacity and service life. Many attempts have been made in the past to improve the electrode assembly of the cells. For example, the known separators which are placed between the positive and the negative plates of a unit cell for preventing the occurrence of short circuit vary widely in type. There have been used and tested separators made of a micro-porous thin sheet produced by impregnating pulp with a resin and by extruding this impregnated pulp into a sheet form, and more recently those separators which are prepared by the use of a base sheet material made of, for example, porous rubber or sintered polyvinyl chloride synthetic fibers and coating such a sheet with an acid-resistive, oxidation-resistive resin and obtained as a micro-porous film. However, these known separators are still far from being satisfactory in their functions when used in lead storage batteries for electric cars.

That is, the separator which is composed of pulp has insufficient resistance to acids and to oxidation and shows a high electrical resistance. Such a separator can not be expected to have a highly improved electric capacity and a long service life. On the other hand, the separator made of a rubber-like porous material and the separator made of a sintered polyvinyl chloride material both have sufficient resistance to acids and oxidation. However, they have a thickness of about 0.2 to 0.5 mm and a considerably high electrical resistance so that when they are applied to lead storage batteries of electric cars, there is the economical inconvenience that the electrode cell units have to be provided in a large number to obtain a high output.

The separator prepared in the form of film which is made of synthetic fibers as the basic material is desirable since it can be produced as an extremely thin film of about 0.1 to 0.3 mm in thickness and has a low electrical resistance. However, such a separator bears the problem such that the permeation of the electrolytic solution, i.e. sulfuric acid, is hindered at the time the battery is discharged and that accordingly there is the difficulty in the retention of sulfuric acid between the micro-porous fiber structure and the positive plate. For this reason, in case it is intended to use the electrode assembly of the "positive plate—glass mat—film separator—negative plate" structure, the glass mat requires to have a thickness of 0.5 mm or more preferably 1.0 mm or more in order to materialize better permeatior and retention of the electrolytic solution. As a result, although this film-like separator per se can be prepared in a very thin sheet form as stated above, the overall distance between the pair of electrodes can not be so effectively reduced as compared with the prior devices, and the battery capacity itself is not satisfactory either.

SUMMARY OF THE INVENTION

The inventors have made an extensive study to overcome such inconveniences and difficulties of the prior art to complete the present invention stated above.

An object of the present invention, therefore, is to provide a paste-type lead storage battery having a highly improved electric capacity and a long service life, whereby the conventional difficulties are solved.

More specifically, the present invention relates, in one aspect, to a paste-type lead storage battery comprising unit cells each being constructed in laminated form with: a positive plate coated on both surfaces thereof with an anode active material, a fibrous structure placed on each side of this positive plate, and a negative plate placed on each said fibrous structure, the invention lying in a separator interposed between said fibrous structure and said negative plate on both sides of said positive plate, said separator being comprised of a paper-like sheet having continuous microporous openings throughout the entire area thereof and containing therein at least 70% by weight of phenol resin fibers each having a diameter of 5 microns or less produced by melt-spinning and curing a novolak resin.

In another aspect, the present invention pertains to a paste-type lead storage battery of the type described above, in which said phenol resin fibers are those wherein at least 60% by mole of the phenolic hydroxyl groups of said resin is capped.

DETAILED DESCRIPTION OF THE PREFERRED EMBODIMENTS

The phenol resin fibers which can be applied to the separators according to the present invention are produced, for example, by blowing a melt of a so-called novolak resin obtained from polycondensation of phenol and formaldehyde with a high velocity air flow in a non-oxidizing atmosphere, followed by crosslinking or curing the resulting fine fibers with hydrochloric acid or formaldehyde or like agents. The fibers thus obtained which can be used in the separators according to the present invention satisfy the requirements that they are 5 microns or less in diameter and that they show good resistance to acids and oxidation, and that they are thermally nonmeltable and insoluble in solvents.

Flexible micro-porous paper-like sheet can be made generally by cutting said fine fibers to staples of 2 mm or less and by making a sheet therefrom with, for example, a resol resin as a binder and by relying on the known wet-type paper-making process.

The lead storage battery of the present invention has a "positive plate—fibrous structure—micro-porous sheet—negative plate" structure. It has a greatly improved electric capacity and a long service life probably for the following reasons.

First of all, the paper-like sheet having fine pores is 0.3 mm or less, preferably 0.1 to 0.15 mm, in thickness and it generally has a very low electrical resistance of 0.1 $\Omega/cm^2$ or less when this sheet is to be used as a separator. Secondly, this sheet is composed of a mass of extremely fine fibers having an average diameter of 5 microns or less, preferably 3 microns or less, so that the sheet perfectly inhibits the passage of anode active materials therethrough, but does not hinder the permeation and diffusion of the electrolytic solution. Therefore, the fibrous structures which are placed in contact with the positive plate can be made much thinner than those used in the conventional devices, such that usually it is possible to use the fibrous structures having a thickness in the range of 1.0 mm or less. However, a thickness lower than 0.05 mm of the fibrous structure is not preferred due to the reduction in the amount of the sulfuric acid which is necessary to be retained between the fibrous structure and the positive plate.

In the lead storage battery obtained as above according to the present invention, the distance between the pair of electrodes can be reduced by about 10 to 30%, and in some cases by as much as about 50%, as compared with the conventional devices so that the battery itself can be made economically compact in size in addition to the ability of exerting a highly improved capacity.

As the fibrous structure, glass mat is used in general. However, woven or non-woven fabrics of synthetic fibers having a good chemical durability, such as polyacrylic, polyvinyl chloride and polyolefin fibers, may be used also.

The fibrous structure must have the function of improving the permeation and diffusion of electrolytic solution in addition to the function of preventing the anode active materials from coming off of or dislocate from the surfaces of the positive plate. Generally speaking, in order to attain the prevention of the anode active materials from coming off of or dislocate from the surfaces of the positive plate, it is advantageous to sufficiently reduce the diameter of the fine fibers and to increase, on the other hand, the density of the fibrous sheet. However, at the present stage of technique, a density of about 30 to 100 g/m$^3$ has heretofore been achieved at most, using fibers of about 15 to 50 microns in diameter.

In the lead storage battery of the present invention, a density of 100 to 200 g/m$^3$ can be adopted, using fibers having a diameter of 10 microns or less, or 5 microns or less wherever required, in the construction of the fibrous structure since the separators exert an extremely high permeation and diffusion of sulfuric acid as discussed above. For this reason, the tendency of the anode active materials to come off of or dislocate from the positive plate can be markedly avoided and thus the lead storage batteries having such fibrous structures in the electrode assembly can have remarkably improved functions such that their life span is twice or more longer than that of the conventional ones using glass mat or pulp separators. As stated above, the lead storage battery according to one aspect of the present invention has excellent functions represented by a highly improved electric capacity, a prolonged service life and compact size, and accordingly, it is quite suitable for use as the power source of an electric automobile.

As the result of a further research, the inventors have found that thermally non-meltable phenol resin fibers such that at least part of the phenolic hydroxyl groups of the resin is capped present more preferable results. That is, such fibers are of better acid-resistivity and oxidation-resistivity so that when the paper-like sheets made of such phenol resin fibers are used as separators placed between the negative plates and the fibrous structures, there can be achieved the making of lead storage battery in a more compact size and also can be obtained a highly improved cell capacity and a high output, and moreover, the generation of active oxygen at the time of charging can be avoided which otherwise will decompose the phenol resin fibers themselves due to oxidation. As a result, the life span of the lead storage battery can be much more prolonged.

The above-said thermally non-meltable phenol resin fibers having at least part of the resin's phenolic hydroxyl groups capped can be manufactured by the following process.

A thermally meltable resin called novolak is used which is prepared by condensation polymerization of phenol and formaldehyde. This resin is subjected to melt-spinning process in a non-oxidizing atmosphere to obtain filament-like or cotton-like fibers. For example, these fibers are then subjected to a reaction with formaldehyde in the presence of an acid catalyst such as sulfuric acid or hydrochloric acid at a temperature of 60° to 105°C for 1 to 20 hours to effect crosslinking in the polymer molecule, thereby producing thermally non-meltable, solvent-insoluble fibers having a degree of hardening of 3 to 30% which represents the increased weight of the cured fibers relative to the weight of the fibers not cured yet. This degree of hardening is used for measurement of the thermosetting property. Thereafter, these cured fibers are reacted either with an acid anhydride such as acetic acid anhydride and phthalic acid anhydride or with an acid halide such as isophthalyl dichloride and terephthalyl dichloride to esterify the phenolic hydroxyl groups. Or alternatively, the cured fibers are reacted either with an alkylating agent such as dimethyl sulfate, methyl bromide and ethyl bromide or with an epoxy group-containing compound such as epichlorohydrin and diglycidylbisphenol-A to etherify the phenolic hydroxyl groups.

It is necessary that at least 60%, more preferably 70% or more and most preferably 80%, by mole, of the phenolic hydroxyl groups be capped. This is because of the reason that the higher the degree of capping, the more resistant to oxydation and acid will become the resulting separator. More specifically, in case less than 60% by mole of the phenolic hydroxyl groups is capped, it is impossible to achieve the prevention of deterioration of the fibers in terms of quality and flexibility of the resulting separator which will be caused by the aforesaid active oxygen generated.

It should be noted that another important requirement for the completion of the present invention is the diameter of those phenol resin fibers having their resin's phenolic hydroxyl groups capped partially. It is essential that these fibers have a diameter of 5 microns or less, preferably 3 microns or smaller, as stated previously. This is because it is intended by the present invention that the paper-like separators comprising such phenol resin fibers are assigned to prevent the passage therethrough of anode active materials as well as the detachment or dislocation of the anode active materials from the surface of the positive plates and also to improve the diffusion and retention of the sulfuric acid, by the continuous micro-porous system which is formed due to the entanglement of very fine fibers. In case the fiber diameter is in excess of 5 microns, such an effect cannot be expected.

The present invention will hereunder be described in further detail with respect to some examples.

EXAMPLE 1

A novolak resin having a molecular weight of 850 obtained by reacting phenol with an aqueous solution of formaldehyde was supplied to a spinning machine and was jetted therefrom into a nitrogen atmosphere to produce novolak resin fibers of 3.5 microns in diameter and 0.5 to 2 mm in fiber length. These fibers were cured with a hydrochloric acid or formaldehyde curing agent so that they became non-meltable. Then, the fibers were subjected to a wet-type paper-making process using a methanol-soluble resol resin having the molecular weight of 420 as the binder to produce a paper-like sheet of 0.15 mm in thickness. Table 1 shows various properties of this sheet as compared with the commercially available separators made of pulp.

Table 1

|  | Thickness (mm) | Electric[a] Resistance ($\Omega/cm^2$) | $PbO_2$ Permeability | Porosity (%) | Tensile Strength ($kg/mm^2$) |
| --- | --- | --- | --- | --- | --- |
| Sheet of the present invention | 0.15 | 0.05 | Entirely non-permeable | 65 | 0.10 |
| Pulp sheet | 1.00 | 0.17 | permeable | 60 | 0.03 |

[a]Determined in sulfuric acid of a specific gravity of 1.28 at room temperature.

Then, batteries having the "positive plate—fibrous structure—paper-like sheet of this invention or commercially available pulp sheet—negative plate" structure were constructed and their cell capacity was determined, and also the capacity after repeating the discharging and charging 100, 200 and 400 times was measured. The result is given in the following Tables 2 and 3.

Table 2

| Separator material | Fibrous structure Material | Thickness (mm) | Capacity[c] (A.hr) Discharging current(A) 1 | 8 |
| --- | --- | --- | --- | --- |
| Outside of this invention | Paper-like sheet of phenol fibers | PAN[a] 0.03 | 3.57 | 1.20 |
| This invention | " | " 0.05 | 3.28 | 1.51 |
| " | " | Glass[b] mat 0.10 | 3.97 | 1.80 |
| " | " | " 0.50 | 4.00 | 1.85 |
| " | " | " 1.0 | 3.82 | 1.78 |
| " | " | " 2.0 | 3.75 | 1.62 |
| Control | Pulp | 0.50 | 3.30 | 1.41 |
| " | | 1.5 | 3.70 | 1.50 |

[a]means non-woven fabric of polyacrylonitrile (fiber diameter: 5 microns).
[b]means mat of glass fibers of 25 microns in diameter.
[c]Capacity at 10 hours' rate: 4 A.hr Table 3

| Separator material | Fibrous structure Material | Thickness (mm) | Capacity (A.hr)[a] after charge-discharge Repeating of charge-discharge (times) 100 | 200 | 400 |
| --- | --- | --- | --- | --- | --- |
| This invention | Paper-like sheet of phenol fibers | Non-woven PAN fabric | 0.5    3.84 | 3.81 | 3.77 |
| | | Glass mat | 0.5    3.98 | 3.92 | 3.50 |
| Control | Pulp | Glass mat | 1.5    3.57 | 2.34 | 0 |

[a]Discharging current = 1A

As will be appreciated from Table 2 above, the fibrous structure to be used in the battery of the present invention appropriately should have a thickness of 0.05 to 1.0 mm, most preferably 0.1 to 0.7 mm, in view of electric capacity. In contrast to this, the battery having separators made of pulp generally is poor in cell capacity as compared with that having the separators obtained according to the present invention. In particular, the battery having fibrous structures made of glass mat of 0.5 mm is found to have an insufficient cell capacity. From this fact, it will be noted that the separators of the present invention display their unique and excellent characteristics in full swing only when they are used in the above defined battery structure of this invention and by doing so there can be obtained a highly improved cell capacity. Furthermore, it will be apparent from Table 3 that the battery according to one aspect of the present invention can be used for a longer period of time than that which utilizes known pulp separators. Especially, it will be understood that, when non-woven fabrics made of polyacrylonitrile (PAN) fibers of small diameters are used as the material of the fibrous structures, a very prolonged life span is obtained, though the cell capacity itself becomes somewhat inferior, as compared with those wherein glass mat is employed.

EXAMPLE 2

Synthetic novolak resin having the molecular weight of 900 was prepared from a reaction between phenol and formaldehyde in the presence of a catalyst which was hydrochloric acid. Then, this resin was extruded by a melt extruder through orifices of various diameters into an atmosphere of nitrogen while nitrogen gas was blown against the streams of molten resin immediately after extrusion from the orifices. Fibers so prepared were then immersed in a mixture bath consisting of 500 cc of undiluted hydrochloric acid and 500 cc of aqueous formaldehyde solution at room temperature. Then, this bath was progressively heated to the temperature of 98°C over the period of 4 hours and maintained at that temperature for 8 hours to perform complete curing and crosslinking. The degree of hardening was 10 to 16%.

The cured phenol resin fibers thus obtained were immersed in an aqueous mixture of 300 g of dimethylacetoamide, 100 g of terephthalyl dichloride and 20 g of p-toluenesulfonic acid at the temperature of 130°C for 3 hours, to cap the phenolic hydroxyl groups.

50 g of the fibers were put into 2000 cc of an aqueous solution of 0.5% Styrene-Butadiene Rubber (SBR), followed by thorough agitation to prepare a uniform dispersion. A paper-like sheet was prepared by picking up the fibers, placing them on a metal wire net and drying them according to the known wet-type paper-making process. Then, the paper-like sheet was pressed at the pressure of 50 kg/cm$^2$ and at the temperature of 80°C for 2 minutes to be formed into a sheet of 0.2 mm in thickness.

Then, a lead storage battery was constructed by assembling together a positive plate, a glass mat of 0.5 mm in thickness, a paper-like separator and a negative plate, in this order. The electric capacity and the durability of this battery were tested and the result is shown in Table 4.

Table 4

|  | Characteristics of separator | | Capacity (A.hr) | | Capacity(A.hr) after charge-discharge | |
| --- | --- | --- | --- | --- | --- | --- |
| | Diameter of fibers (micron) | Tensile strength (kg/mm$^2$) | Electrical resistance (Ω/cm$^2$) | Discharge current(A) | | Number of repeated discharge-charge (times) |
| | | | | 1 | 8 | 200 | 400 |
| Control | 7–8 | 0.18 | 0.05 | 3.87 | 1.82 | 3.57 | 1.02 |
| Product of this invention | 4–5 | 0.20 | 0.05 | 3.92 | 1.86 | 3.89 | 3.77 |
| -do- | 1–2 | 0.22 | 0.06 | 3.94 | 1.88 | 3.92 | 3.89 |

From Table 4, it will be appreciated that the larger the fiber diameter is, the shorter will become the life span of the battery. It will, therefore, be understood that the fibers require to have a diameter of 5 microns or less, preferably 2 microns or smaller.

We claim:

1. A paste-type lead storage battery comprising unit cells each being constructed in laminated form including a positive plate coated on both surfaces thereof with an active material, a fibrous structure placed on each side of said positive plate, and a negative plate placed on each said fibrous structure, the improvement comprising a separator interposed between said fibrous structure and said negative plate on both sides of said positive plate, said separator consisting of a paper-like sheet having continuous micro-porous openings throughout the entire area thereof and containing at least 70% by weight of phenol resin fibers, each having a diameter of 5 microns or less, produced by melt-spinning and curing a novolak resin, said phenol resin fibers having at at least 60% by mole of the phenolic hydroxyl groups of said resin being capped to esterify or etherify said phenolic hydroxyl groups.

* * * * *